3,244,673
POLYURETHANES FROM POLYESTERS CONTAINING MONOCARBOXYLIC ACIDS
Pieter Bruin and Maarten Sluis, Amsterdam, Netherlands, assignors to Shell Oil Company, New York, N.Y., a corporation of Delaware
No Drawing. Filed Oct. 8, 1962, Ser. No. 229,207
Claims priority, application Netherlands, Oct. 10, 1961, 270,073
4 Claims. (Cl. 260—76)

This invention relates to the preparation of resilient or elastomeric materials. More particularly, the invention relates to the production of polyurethane resins and plastics.

Specifically, the invention provides a process for preparing novel polyurethane resins which comprises reacting an organic polyfunctional isocyanate and a polyester prepared by reacting (1) a polyvalent compound such as polyvalent hydroxy compounds and epoxy compounds, (2) a polycarboxylic acid or polycarboxylic acid anhydride and (3) alpha-branched saturated aliphatic monocarboxylic acids.

Polyurethanes have been prepared in several forms. One form of the polyurethane is a polymeric material, often referred to for convenience as polyurethane "prepolymer," which is obtained by reacting an organic polyfunctional isocyanate or a polyfunctional isothiocyanate with an organic compound containing in the molecule a plurality of active, hydrogen atoms (as determined by the Zerewitinoff method, J.A.C.S., vol. 49, page 3181, 1929), such as, for example, an organic polyhydroxy compound. While such prepolymers are in themselves useful polymeric materials, for example, prepolymers can be molded or cast into sheets or converted into synthetic rubbers, such prepolymers are at present particularly useful as intermediates for the production of another form of polyurethane, namely, a cross-linked polyurethane which for convenience of description is referred to herein as a polyurethane "plastic." Such polyurethane plastics can be prepared from prepolymers either (a) by reacting a prepolymer which contains free isocyanate or isothiocyanate radicals with a compound containing in the molecule a plurality of active hydrogen atoms or (b) by reacting with a polyisocyanate or a polyisothiocyanate, a prepolymer which contains active hydrogen atoms but which substantially does not contain free isocyanate or isothiocyanate radicals. In the second-mentioned case the prepolymer will usually contain active hydrogen atoms in the form of hydroxyl groups. The polyisocyanates and polyisothiocyanates referred to herein are organic compounds of the general formula $R(NCX)_{n+1}$, wherein R represents an organic radical, X represents an oxygen atom or a sulfur atom and $n$ is a positive integer.

It is also possible to prepare polyurethane plastics directly by reacting an organic polyisocyanate or polyisothiocyanate with an organic compound or compounds containing in the molecule a plurality of active hydrogen atoms under such conditions that the desired cross-linked polyurethane plastic is formed. This direct method of preparation is often referred to in the art as the single-stage or "one-shot" method, and from the manufacturing point of view it is often to be preferred to the two-stage method involving, as the first stage, the preparation of a prepolymer.

The polyurethane plastics are particularly useful when in the form of the cellular materials commonly known as polyurethane foams which, depending upon their physical properties, find particular application as insulating and shock-absorbing materials which may be used for many purposes in industry. Depending on the nature of the starting materials and the conditions under which the polyurethane foams are prepared it is possible to produce rigid foams suitable, for example, for heat insulation and resilient foams of various degrees of resilience suitable, for example, for shock absorption and for seat coverings, carpet underlays and many other purposes including, in the case of open-cell resilient foams, sound insulation. In general, polyurethane foams can be prepared by "blowing" the reaction mixture during the conversion of a prepolymer into a polyurethane plastic, or, in the case of the one-shot method, by blowing the reaction mixture in which the polyurethane plastic is produced directly from starting materials comprising a polyisocyanate or polyisothiocyanate and an organic compound having in the molecule a plurality of active hydrogen atoms. In either case blowing can be accomplished for example by such techniques as generating a gaseous blowing agent, e.g., carbon dioxide in situ in the reaction mixture or by supplying a gaseous blowing agent such as air thereto. In the case of the one-shot method, the reactants are usually mixed in a so-called mixing head fitted with a stirrer capable of rotation at speeds of the order of 2000 to 5000 r.p.m. In addition to promoting rapid and thorough mixing of the reactants the action of the stirrer also aids foam formation.

Theoretically at least the reaction which takes place during the formulation of polyurethane resins by reacting an organic polyfunctional isocyanate or polyfunctional isothiocyanate with an organic compound containing a plurality of reactive hydrogen atoms is applicable to a large number of such organic compounds. On the other hand, however, the properties of the resulting polyurethane resins, and plastics prepared therefrom, depend to a large extent on the particular kind of organic compound used. It has been found that the organic compounds used have a marked effect on the properties of the polyurethane resins produced. Some organic compounds are better than others from the point of view of producing resins having more desirable physical properties, for example, color, thermal stability, moldability and, in the case of elastomeric products, resilience and deformation recovery. A particularly important application of polyurethanes is in the production of resilient cellular polyurethane plastics, and in this field of application a high degree of strength and an ability to recover quickly from deformation while at the same time having good resistance to fatigue, are desirable properties.

It has now been found that polyurethanes having excellent physical properties as well as improved chemical resistance are obtained when polyisocyanates are reacted with polyester resins containing hydroxyl groups and in which the ester groups have been derived from aliphatic saturated monocarboxylic acids wherein the carboxyl groups are attached to tertiary and/or quaternary carbon atoms.

It is, therefore, an object of the present invention to provide a process for preparing polyurethane resins and plastics. It is another object of the invention to provide a process for preparing polyurethane resins which have excellent physical properties such as strength, deformation recovery and resistance to fatigue. It is another object to provide polyurethane resins which not only have excellent physical properties but also have improved chemical resistance, particularly against staining. These and other objects of the invention will be apparent from the following description thereof.

It has now been discovered that these and other objects may be accomplished by polyurethane resins which comprise the reaction product of a polyisocyanate and a polyester prepared by reacting (1) a polyvalent hydroxy compound and/or epoxy compound, (2) a polycarboxylic acid and/or polycarboxylic acid anhydride and (3) alpha-branched saturated aliphatic monocarboxylic acids and/or glycidyl esters of alpha-branched saturated aliphatic monocarboxylic acids.

It has now been discovered that polyurethanes prepared by reacting polyisocyanates with polyesters (alkyd) resins wherein the ester groups have been derived from saturated aliphatic monocarboxylic acids whose carboxyl groups are attached to tertiary and/or quaternary carbon atoms not only have excellent physical properties but also have unexpected improved chemical properties, i.e., resistance to acid vapors, alkaline substances, hydrocarbons, ketones, and esters as well as improved sensitivity to substances which cause staining.

For the sake of brevity, the saturated aliphatic monocarboxylic acids whose carboxyl group is attached to a tertiary or quaternary carbon atom will usually, in this specification, be referred to as branched or alpha-branched monocarboxylic acids.

As saturated aliphatic monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are usually called Koch acids in the art "Carbonsaure—Synthese aus Olefinen, Kohlenoxyd und Wasser," Koch, Brennstoff-Chemie, November 1955, pages 321–328. Monocarboxylic acids branched at the alpha position can also be obtained according to Reppe's method. Of special value are the acids from mono-olefins with 8 to 18 carbon atoms. Mixtures of olefins obtained by cracking paraffinic hydrocarbons, such as petroleum fractions, are preferably used as starting material. These mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

In general, these alpha-branched saturated aliphatic monocarboxylic acids may be represented by the general formula

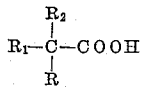

wherein $R_2$ and $R_3$ are alike or unlike and are each an alkyl group; $R_1$ is a hydrogen atom or an alkyl group, said monocarboxylic acids contain at least 9 carbon atoms in the molecule.

Polyesters derived from branched monocarboxylic acids can in general be prepared by reaction between (a) polycarboxylic acids and/or anhydrides thereof,
(b) polyvalent hydroxy and/or epoxy compounds, and
(c) monocarboxylic acids which are at least partly saturated aliphatic monocarboxylic acids, the carboxyl groups of which are attached to tertiary and/or quaternary carbon atoms.

Such polyesters can be prepared by any known method such as those disclosed in copending United States application Serial Number 151,157, filed November 9, 1961.

Instead of (b) and (c) one may also take, either entirely or in part, esters derived from (b) and (c), such as, for example, epoxy alkyl esters, such as glycidyl esters or partial esters, such as monoglycerides.

The said branched monocarboxylic acids may be converted into epoxy alkyl esters by any suitable method such as, for example, by simply reacting a halo-substituted monoepoxide with the alpha-branched saturated aliphatic monocarboxylic acid, or their salts, to obtain the desired esters.

Suitable halo-substituted monoepoxides include those wherein a carbon atom is directly linked to a halogen atom and to a carbon atom of a oxirane ring, i.e.,

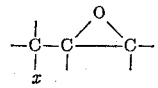

wherein $x$ represents a halogen, and the valencies are satisfied by linkage to hydrocarbyl radicals. The chloroepoxy compounds are generally preferred although the use of corresponding bromo and fluoro compounds may also be used. The halo-substituted epoxide reactants may suitably contain from 3 to about 20 carbon atoms to the molecule. A preferred reactant is epichlorohydrin. Other examples of suitable halo-substituted epoxide reactants include, among others, epibromohydrin, epifluorohydrin, 1-chloro-2,3-epoxybutane, 1-chloro-2,3-epoxyhexane, 1-chloro-2,3-epoxy-4-phenyl octane, 1-chloro-2,3-epoxy-4,5-diethyl dodecane and 3-chloro-4,5-epoxy octane.

A dihalohydrin may also be used as a suitable reactant and comprise broadly the hydroxy-dihalo-substituted hydrocarbons containing a halogen atom linked directly to a carbon atom which is, in turn, linked directly to a carbinol carbon atom. Suitable dihalohydrins comprise the fluoro-, bromo- or chlorohydrins with chlorohydrins generally being preferred. Suitable such dichlorohydrins comprise the hydroxy-dichloro-substituted alkanes containing from 3 to about 20 carbon atom sand having a chlorine atom and a hydroxyl group attached to adjacent carbon atoms. Suitable hydroxy-dichloro-substituted alkanes include, among others, 1,3-dichlorohydrins, their homologues and analogues.

The epoxy alkyl esters of the alpha-branched saturated aliphatic monocarboxylic acids may be obtained simply by the interaction of the hereinbefore defined alpha-branched acids with the suitable halo-substituted monoepoxide or dihalohydrin under any conditions enabling one to obtain the desired esters. Thus, they may be prepared by suspending a suitable salt of the alpha-branched acid, preferably in a finely divided solid state, in a liquid phase consisting essentially of an epoxy halo-alkane or containing an epoxy halo-alkane together with a solvent or diluent for the latter. The salts of the monocarboxylic acids used are generally the alkali metal salts, such as the sodium or potassium salts, and occasionally the alkaline earth metal salts. The quaternary ammonium salts of the alpha-alkyl alkane monocarboxylic acids are also very suitable. The epoxy halogen alkane is generally used in excess, for example, in a quantity of from about 1.05 to about 15 times the stoichiometric quantity. The suspension is heated for some time, usually some hours, with stirring. Suitable reaction temperatures comprise those in the range of from about 50° C. to about 150° C. If the epoxy halogen alkane used is epichlorohydrin, the reaction may be carried out at substantially the boiling temperature of this compound, at atmospheric pressure. Suitable catalysts comprise the tertiary amines, such as triethyl amine, triphenyl amine or tricyclohexyl amine; and the quaternary ammonium salts, such as tetramethyl ammonium chloride, tetramethyl ammonium bromide, tetrabutyl ammonium chloride, benzyl trimethyl ammonium chloride, benzyl trimethyl ammonium sulphate, cyclohexyl trimethyl ammonium bromide, phenyl trioctyl ammonium chloride and diphenyl dimethyl ammonium borate. It is, at times, advantageous to incorporate into the mixture a small additional quantity of an alkaline material, for example, an alkali metal hydroxide, alkali metal carbonate or calcium oxide, in addition to the salt reactant which frequently acts as an alkaline agent. The resulting esters are separated from the reaction mixture by suitable means such as filtration, distillation and/or crystallization.

The epoxy halo-alkane is preferably employed in the liquid state, and optionally in the presence of a solvent or diluent. Suitable solvents or diluents include, among others, normally liquid hydrocarbons, dioxane, ketones and mixtures of two or more thereof.

Alkali metal salts and quarternary ammonium salts may be very suitably used as salts of the alpha-branched monocarboxylic acids. These salts are generally readily soluble in water so that concentrations up to approximately 50% by weight may be used in the solutions. An excess of the epoxy halogen alkane is preferably used, with the quantity used being generally from about 2 to 15 times, usually about 4 to 10 times, that theoretically required for the conversion of the carboxylic acid. The temperature is generally kept between 50 and 180° C. although temperatures outside this range may be used. Preferred reaction temperatures are in the range of from about 70° C. to about 130° C. If the epoxy halogen alkane used is epichlorohydrin, the reaction may be effected at the boiling temperature of the mixture. The epichlorohydrin and the water may be distilled off together by azeotropic distillation; epichlorohydrin may be recycled to the reaction space. The starting carboxylic acid salt solution is preferably added gradually to the liquid epoxy halo-alkane. The concentration of the water can thus remain very low provided water is removed azeotropically during the course of the process.

The polycarboxylic acids which may be used in the preparation of the polyester resins may be saturated, unsaturated, alicyclic or aromatic and may possess two, three, four or more carboxyl groups. Examples of such acids are malonic, glutaric, succinic, suberic, citric, aconitic, tricarballylic, cyclohexanedicarboxylic, maleic, fumaric, itaconic, citraconic, mesaconic, phthalic, isophthalic, terephthalic, tetrahydrophthalic anhydride, 1,8-naphthalenic, adipic, sebacic, azelaic, pimelic, chlorosuccinic, bromomaleic, dichlorophthalic, dilactic, dihydracrylic benzophenone-2,4'-dicarboxylic acid, trimellitic acid, dimerized fatty acids of drying oils, and Diels-Alder adducts of maleic acid with dienes such as terpenes, cyclopentadiene and hexachlorocyclopentadiene.

The preferred polycarboxylic acids to be use in producing the polyester resins are the dicarboxylic acids containing less than 12 carbon atoms, such as succinic acid, glutaric acid, adipic acid, suberic acid, maleic acid, cyclohexanedicarboxylic acid, phthalic acid, diethyl phthalic acid and the like. Particularly preferred polycarboxylic acids are the aromatic dicarboxylic acids and anhydrides containing from 8 to 12 carbon atoms wherein the two carboxyl groups are attached directly to the aromatic ring.

In some cases it may be desirable to utilize other forms of the acid, such as the acid anhydrides or the acid chlorides, as phthalic anhydride, maleic anhydride, succinic chloride and the like.

If desired, two or more of these polycarboxylic acids can be used together. Wherever possible the use of the anhydrides of the polycarboxylic acids is preferred.

The polycarboxylic acids and/or alpha-branched saturated aliphatic monocarboxylic acids may be replaced in part by unsaturated monocarboxylic acids in order to increase flexibility. These unsaturated monocarboxylic acids include, among other, the fatty acids from drying oils, such as linseed oil, Chinese wood oil, soybean oil, fish oil, cottonseed oil, oiticica oil, perilla oil, sunflower oil, as well as dehydrated fatty acids from castor oil, and fatty acids from tall oil. Other unsaturated monocarboxylic acids that may be applied are, for example, acrylic acid and methacrylic acid. Particularly suitable are the aliphatic fatty acids having from 12 to 20 carbon atoms in the molecule.

As polyvalent hydroxy and/or epoxy compounds, preferably used are those containing three or more hydroxy equivalents per molecule, one epoxy group being taken to be equivalent to two hydroxy groups. If desired, two or more of these compounds may be used together. Thus, trivalent hydroxy and/or epoxy compounds may be used together with bivalent hydroxy compounds and/or monoepoxy compounds. As examples may be mentioned the hydroxy compounds glycerol, pentaerythritol, trimethylolpropane and 1,2,6-hexane triol, and the epoxy compounds glycidol and di-epoxybutane and further such mixtures as glycerol with diethylene glycol, pentaerythritol with dipropylene glycol and glycidol with dipropylene glycol. Particularly preferred are the aliphatic and cycloaliphatic polyvalent hydroxy (polyols) and/or epoxy compounds having from 3 to 12 carbon atoms per molecule.

A functionality of at least 3, so far as the ester-forming functions are concerned, in at least some of the starting materials is important for achieving branching and a three-dimensional structure. This also applies to the polyvalent hydroxy and/or epoxy compounds and/or to the polycarboxylic acids and/or anhydrides thereof, from which, if desired, first esters may be prepared which still contain free hydroxyl and/or epoxy groups and which are then reacted with monocarboxylic acids. Ester-forming functions comprise hydroxyl groups, epoxy groups and carboxyl groups.

The reaction is generally performed at temperatures betwen 130 and 270° C., during a stage in which water is formed a temperature between 190 and 250° C. is preferably maintained. Thus, one may react phthalic anhydride, glycidol and branched monocarboxylic acids first at 150° C., at which temperature mainly epoxy groups and anhydride groups react, and then raise the temperature to 190–230° C. which causes the reaction to continue with formation of water.

An organic solvent, as for example, xylene, may be added to the reaction mixture. The water formed during condensation can easily be removed together with xylene by azeotropic distillation.

The proportions of the various ingredients can vary over a wide range. The preferable or optimum proportion of the polyhydric alcohol or expoxy compound to the total acid will, for example, depend on many factors including the particular alcohol used, the particular dibasic acid or anhydride used, the particular branched monocarboxylic acids used and the properties desired. However, in general, the equivalents of total acid (polybasic acid and monocarboxylic acids) to alcohol will be in the range of from about 1.2:1 to about 1:4. Of the total acids, the ratio of polycarboxylic acid to branched monocarboxylic acid will vary within wide limits. However, the ratio of polycarboxylic acid to branched monocarboxylic acids on an equivalent basis will range from about 0.8:1 to about 3:1. If unsaturated monocarboxylic acids are also used to obtain air-drying alkyd resins, such acids are to be included in the calculation of total acids as well as the polycarboxylic acids and/or anhydrides and alpha-branched saturated aliphatic monocarboxylic acids. In general, up to 50% of the alpha-branched saturated aliphatic monocarboxylic acids may be replaced with unsaturated monocarboxylic acids.

In general, it is preferred to have an excess of polyhydric alcohol or epoxy compound, and in most cases the excess will be in the range of from 1% to 50% based on the stoichiometric quantity of the polyhydric alcohol. Such excess alcohol is generally desirable to prevent premature gelation during resin formation.

Suitable polymerization catalysts for preparing the polyesters are, in particular, those which give free radicals. In the first place peroxides may be mentioned, as, for instance, benzoyl peroxide, ditertiary butyl peroxide, dicumyl peroxide, cumyl hydroperoxide. Also, other compound producing radicals, such as azoisobutyronitrile, are suitable. In some cases other polymerization catalysts, such as Friedel-Crafts catalysts, can be used as well. The quantities used of the various catalysts generally are between 0.001 and 5% by weight, calculated on the alkyd resin.

The number of free hydroxyl groups of the polyesters is very important. When more than one hydroxyl equivalent per 100 g. of polyester is present, mixtures according to the invention may be prepared that cure rapidly.

The products thus obtained are in general highly resistant to the action of the chemicals, such as acid vapors and alkaline substances and to the action of organic liquids, such as aliphatic and aromatic hydrocarbons, ketones and esters. Another advantage of cured products manufactured or prepared with such polyesters is their unexpectedly low sensitivity to many substances that are known to cause stains. Owing to their greater resistance, the mixtures concerned may, in particular, be applied in paint and lacquer compositions for coating or embellishing floors, walls, doors, domestic appliances and industrial equipment, in general, therefore, where contact with solvents, softeners, corrosives and staining substances is possible.

Further improvement in resistance can generally be effected by starting from polyesters containing significantly more than 1 hydroxyl equivalent per 1000 grams, for instance more than 1.8 hydroxyl equivalents per 1000 grams.

Suitable polyisocyanates which may be used to react with the above-mentioned polyester resins are those compounds which have on the average more than one isocyanate group per molecule, such as those polyisocyanates which can be obtained by the reaction of polyamines with phosgene, such as, for example, toluene diisocyanate, hexamethylene diisocyanate, diphenylmethane diisocyanate, triphenylmethane triisocyanate, naphthalene diisocyanate, meta-phenylene diisocyanate, diphenyl diisocyanate, diphenyl ether diisocyanate, dianisidine diisocyanate, ethylene diisocyanate and diethyl ether diisocyanate. Polyisocyanates of these types may be applied separately or as mixtures, as for example, mixtures of isomers, such as the mixtures of the isomers 2,4-toluene diisocyanate and 2,6-toluene diisocyanate.

Use can also be made of non-volatile polyisocyanates which have been obtained by reaction of polyhydric alcohols, such as ethylene glycol, glycerol and 1,2,6-hexane triol, with an excess of polyisocyanates of the above-mentioned type. An example of such a non-volatile polyisocyanate is the addition product of 1 mole of trimethylolpropane with 3 moles of toluene diisocyanate.

Instead of polyisocyanates one may also, if desired, utilize compounds which contain "blocked" isocyanate groups. Such compounds are understood to be those from which polyisocyanate is liberated by heat. Examples are the reaction products of the volatile monovalent phenols with polyisocyanates, such as the reaction product of 3 moles of phenol with the above-mentioned addition product of 1 mole of trimethylolpropane with 3 moles of toluene diisocyanate. Mixtures according to the invention, containing blocked polyisocyanates and polyesters according to the above description, usually cure already at room temperature. Curing may also be accelerated by applying higher temperatures, as for example, temperatures up to 200° C., and in particular, temperatures between 140 and 160° C. Also temperatures below 140° C. are suitable, particularly when only moderately accelerated curing is desired.

Such mixtures may be applied to prepare polyurethane paints and lacquers, to prepare polyurethane rubbers, and for making polyurethane foams.

The polyesters referred to may be mixed with polyisocyanates in many ratios, according to the field of application. As a measure of this ratio it is indicated in the specification and in the examples that the ratio indicates in chemical equivalents, namely the number of polyisocyanate groups (blocked or otherwise) present per hydroxy group. For the preparation of paint and lacquer compositions an isocyanatehydroxyl ratio between 0.8 and 1.3 is generally chosen, and preferably between 1.0 to 1.1. From such mixtures coatings have been obtained which were hard as well as flexible, which had high impact resistance and were highly resistant to many chemicals and solvents. They also had a high gloss and exhibited virtually no loss of gloss after prolonged exposure to light and ultra-violet radiation.

One may also choose considerably higher ratios, for instance, for preparing paint and lacquer compositions which cure by the action of water vapor, or for making foams. In these cases some of the isocyanate groups react with water vapor or water while carbon dioxide is split off with the liberated amino groups being able to react with other isocyanate groups.

In mixtures according to the invention other materials may also be incorporated, such as solvents, diluents, pigments, fillers and, if desired, accelerators and/or foaming agents.

Suitable solvents and diluents for this purpose are liquids which do not react with isocyanate groups and therefore must not contain hydroxyl, amino, or carboxyl groups. Furthermore, a low water content is desirable. Examples of suitable solvents are esters, such as beta-ethoxyethyl acetate and ethyl acetate, or ketones, such as acetone, methyl ethyl ketone, methyl isobutyl ketone, ethyl amyl ketone and Pent-oxone (methyl ether of diacetone alcohol). Suitable diluents include, among others, benzene, toluene, and xylene. One may also apply mixtures of various solvents and/or diluents, as for example, mixtures of a high-boiling solvent such as beta-ethoxyethyl acetate, a lower boiling solvent, such as methyl isobutyl ketone and a diluent such as xylene, for instance, in the ratio by weight of 1:3.

To mixtures according to the invention may be added substances that accelerate curing. Examples are tertiary amines, such as N-methyl morpholine, dimethylethanolamine, triethylamine, N,N-dimethylcyclohexylamine, or also partially esterified amino alcohols. Other examples are salts of cobalt and other heavy metals with naphthenic acids or with branched monocarboxylic acids.

Mixtures according to the invention may be allowed to cure with foaming by the addition of foaming agents. Preferably, polyesters are used which are derived from aliphatic dicarboxylic acids, for example, adipic acid; and from aryl aliphatic dicarboxylic acids or from mixtures of aliphatic and aromatic dicarboxylic acids, such as mixtures of adipic acid and phthalic acid. Very suitable polyesters are also those derived from polyhydric alcohols containing alcohol groups which are separated by at least 4 atoms in the connecting chain, such as triethylene glycol or dipropylene glycol. Alkyd resins prepared with the aid of hydroxystearic acid are also suitable. The polyisocyanate used is preferably toluene diisocyanate or isomeric mixtures thereof. The foaming agent may, for example, be water. When foaming is effected at elevated temperatures, however, other foaming agents are preferred, such as alcohols together with strong acids. Examples of suitable alcohols are tertiary butyl alcohol and tertiary amyl alcohol. Examples of suitable strong acids are sulphuric acid and phosphoric acid. In such foam-forming mixtures other materials may also be incorporated, such as surface-active agents, fillers, pigments and fibrous materials, such as, for example, glass fibers and asbestos fibers. Such foams may be allowed to harden while being shaped. The foams may be used for many applications, such as for thermal insulation in refrigerators and aircraft.

To illustrate the manner in which the invention will be carried out, the following examples are given. It is to be understood, however, that the examples are for the purpose of illustration and the invention is not to be regarded as limited to any of the specific conditions or reactants cited therein. Unless otherwise specified, parts described in the examples are by weight.

The branched monocarboxylic acids ($C_9$–$C_{11}$) have been obtained by reacting olefins containing from 8 to 10 carbon atoms per molecule with carbon monoxide and water in the presence of a catalyst consisting of phosphoric acid, boron trifluoride, and water. They contain 9 to 11 carbon atoms per molecule and the carboxyl groups are attached to tertiary and/or quaternary carbon atoms. The sodium salts thereof have been converted into the glycidyl esters with the aid of epichlorohydrin.

The polyesters used in the examples were prepared by the following recipes wherein the parts are by weight, and are designated as Polyester A, Polyester B, etc., for convenience. Viscosity was determined in a 50% solution in xylene.

Polyester A

A mixture of 370 parts of phthalic anhydride, 300 parts of glycerol, and 65 parts of xylene was kept for 9 hours at a temperature of 200–240° C. in a nitrogen atmosphere. The water formed during esterification was continuously removed by azeotropic distillation with xylene. After cooling to 150° C., 1095 parts of phthalic anhydride and 1850 parts of glycidyl esters of branched monocarboxylic acids ($C_9$–$C_{11}$) were added. The mixture was then kept at 150° C. for another hour.

The resin had a viscosity of 42 centistokes and contained 121 meq. of hydroxyl per 100 g. of dry material. It was diluted with water-free xylene to a content of 50% by weight of dry material.

Polyester B

A mixture of 74 parts of phthalic anhydride, 60 parts of glycerol, and 15 parts of xylene was kept for 9 hours at a temperature of 200–240° C. in a nitrogen atmosphere. The water formed during esterification was continuously removed by azeotropic distillation with xylene. After cooling to 150° C., 74 parts of phthalic anhydride and 121 parts of glycidyl esters of branched monocarboxylic acids ($C_9$–$C_{11}$) were added. The mixture was then kept at 150° C. for another 1½ hours.

The resin had a viscosity of 232 centistokes and contained 245 meq. of hydroxyl per 100 g. of dry material. It was diluted with water-free xylene to 50% w. of dry material.

Polyester C

A mixture of 54.7 parts of glycidyl esters of branched monocarboxylic acids ($C_9$–$C_{11}$), 48.2 parts of glycerol, 111 parts of phthalic anhydride, 67.5 parts of hydroxystearic acid, and 28 parts of xylene was heated to 190° C. in a nitrogen atmosphere. The temperature was then raised to 240° C. in one hour. The water formed during esterification was continuously removed by azeotropic distillation with xylene. The mixture was then kept at 240° C. for another half-hour.

The resin had a viscosity of 422 centistrokes and contained 192 meq. of hydroxyl per 100 g. of dry material. It was diluted with water-free xylene to 50% w. of dry material.

Polyester D

A mixture of 97.2 parts of glycidyl esters of branched monocarboxylic acids ($C_9$–$C_{11}$), 36.8 parts of glycerol, 35.0 parts of adipic acid, 82.9 parts of pthalic anhydride, 25 parts of xylene, and 0.1 part 50% solution of KOH was heated to 190° C. in a nitrogen atmosphere. The temperature was then raised to 240° C. in one hour. The water formed during esterification was continuously removed by azeotropic distillation with xylene. The mixture was then kept at 240° C. for another half-hour.

The resin had a viscosity of 606 centistokes and contained 184 meq. of hydroxyl per 100 g. of dry material and was diluted with water-free xylene to 50% w. of dry material.

The polyisocyanate used in Examples I to IX was a reaction product of toluene diisocyanate and trimethylolpropane in a molar ratio of 3:1, dissolved in 25% w. of ethyl acetate. It contained 13% w. of isocyanate groups and only 0.5% w. of free toluene diisocyanate.

Paint and lacquer coats were evaluated from the rate of cure, hardness, flexibility, impact resistance and resistance to chemicals, solvents, and staining substances. Some of the test methods are further described.

A paint or lacquer coating is called cotton-free if fibers no longer adhere to it when a piece of cotton-wool 2–3 cm. in size is dropped from a height of 20 cm. on to the horizontally placed coating and blown away after 10 seconds.

Hardness was determined according to the methods of Buchholz and König. Impact resistance was determined according to the British Standard Method in which impact resistance is recorded as the product of the height (in cm.) from which a weight (in kg.) has to drop on to painted metal panels to make the coating crack. Flexibility was determined by bending a coated metal panel successively round mandrels having diameters of ½, ⅛, and ⅟₁₆ inch and examining the coating for cracks. The Erichsen penetration was determined by slowly pressing a metal ball into a coated metal panel which was supported around the point of impact by a ring and ascertaining how many millimeters the ball could be pressed into the panel before the coating cracked.

Resistance to chemicals was evaluated by exposing the coating at 25° C. for 7 days to the action of a 5% solution of sodium hydroxide and a 5% solution of acetic acid. The rating 0 means that the film was completely destroyed; the rating 10, no attack. Gloss was measured in comparison with a black plate-glass panel.

Example I 83.6 parts of polyester solution A were mixed in a ball mill with 90 parts of titanium white. 16.4 parts of polyisocyanate were then added with stirring. The paint was brought to spraying viscosity with xylene and sprayed on to thin steel panels.

One test panel was kept at 50° C. for 15 hours. The hardness (König) of the paint film was then 190 seconds.

The other panels were kept at room temperature. The paint coating was cotton-free within 5 hours. After three weeks its properties were as follows:

Hardness (König) _____ 120 s.
Impact resistance _____ 3.5 kg. cm.
Resistance after 7 days' exposure to acetic
  acid vapor _____ 9.
Resistance to gasoline _____ Excellent.
Resistance to 5% NaOH at 100° C. after
  15 minutes _____ 9.
Gloss _____ 105.

After the panel had been exposed for 1000 hours to the radiation of a carbon arc in the "Atlas Weatherometer" the gloss was only slightly reduced, viz. to 82.

Example II 67.25 parts of polyester solution B were mixed with 32.75 parts of polyisocyanate. The ratio of NCO:OH was 1.15. The mixture was applied as an unpigmented lacquer to steel test panels. After 4 weeks at room temperature the hardness (König) was 213 seconds and resistance to methyl isobutyl ketone and ethoxyethyl acetate was excellent.

Example III 71.7 parts of polyester solution B were mixed in a ball mill with 90 parts of titanium white. 28.4 parts of polyisocyanate were then added with stirring. The paint was brought to spraying viscosity with xylene and sprayed on to thin steel test panels. The panels were kept at room temperature.

The paint coating was cotton-free within 5 hours; at the end of three weeks the properties were as follows:

| | |
|---|---|
| Hardness (König) | 160 s. |
| Gloss | 112. |
| Resistance after 7 days' exposure to acetic acid vapor | 7. |
| Resistance to gasoline | Excellent. |
| Resistance to xylene | Do. |
| Resistance to methyl isobutyl ketone | Do. |
| Resistance to ethoxyethyl acetate | Do. |
| Staining by lipstick | None. |
| Staining by mustard | Do. |
| Staining by shoe polish | Do. |

*Example IV*

76.4 parts of polyester solution C were mixed with 23.6 parts of polyisocyanate. The ratio of NCO:OH was 1.0. The mixture was applied as an unpigmented lacquer to steel test panels.

Some of the panels were kept at 50° C. for 15 hours. The hardness (König) of the lacquer coating was then 130 seconds; the resistance to xylene and methyl isobutyl ketone was excellent, the resistance to ethoxyethyl acetate was sufficient.

Other panels were kept at room temperature for 3 weeks. The hardness (König) of the lacquer coating was 172 seconds, the resistance to xylene and methyl isobutyl ketone was excellent, and the resistance to ethoxyethyl acetate was good.

*Example V*

76.4 parts of polyester solution C were mixed in a ball mill with 90 parts of titanium white. Then 23.6 parts of polyisocyanate were added with stirring. The paint was brought to spraying viscosity with xylene and sprayed on to thin steel test panels and kept at room temperature.

The paint coating was cotton-free within 5 hours, and after three weeks the properties were as follows:

| | |
|---|---|
| Hardness (König) | 172. |
| Impact resistance | 8 kg. cm. |
| Penetration (Erichsen) | 4.7 mm. |
| Gloss | 99. |
| Resistance after 7 days' exposure to acetic acid vapor | 8. |
| Resistance to gasoline | Excellent. |
| Resistance to xylene | Do. |
| Resistance to methyl isobutyl ketone | Good. |
| Resistance to ethoxymethyl acetate | Sufficient. |
| Staining by lipstick | Very slight. |
| Staining by mustard | Do. |
| Staining by shoe polish | Heavy. |

*Example VI*

77.1 parts of polyester solution D were mixed with 22.9 parts of polyisocyanate. The ratio of NCO:OH was 1.0. The mixture was applied as an unpigmented lacquer to steel test panels.

Some of the panels were kept at 50° C. for 15 hours. The hardness (König) of the lacquer coating was then 170 seconds; the resistance to xylene and methyl isobutyl ketone was excellent, and the resistance to ethoxyethyl acetate was sufficient.

Other panels were kept at room temperature for 3 weeks. The hardness (König) of the lacquer coating was 130 seconds; the resistance to xylene was excellent, and the resistance to methyl isobutyl ketone and ethoxyethyl acetate was amply sufficient.

*Example VII*

77.1 parts of polyester solution D were mixed a ball mill with 90 parts of titanium white. Then 22.9 parts of polyisocyanate were added with stirring. The paint was brought to spraying viscosity with xylene and sprayed on to thin steel test panels and kept at room temperature.

The paint coating was cotton-free within 5 hours. After three weeks the properties were as follows:

| | |
|---|---|
| Hardness (König) | 135 s. |
| Impact strength | 14 kg. cm. |
| Flexible round a mandrel of | 1/16 inch. |
| Penetration (Erichsen) | 5.5 mm. |
| Gloss | 99. |
| Resistance to gasoline and xylene | Excellent. |
| Resistance to methyl isobutyl ketone | Amply sufficient. |
| Staining by lipstick | Scarcely perceptible. |
| Staining by mustard | Do. |
| Staining by shoe polish | Very slight. |

*Example VIII*

68.3 parts of polyester solution E were mixed with 31.7 parts of polyisocyanate. The ratio of NCO:OH was 1.1. This mixture remained liquid for some days. After it had been diluted with ethoxy-ethyl acetate the mixture was sprayed on to thin steel test panels and then stoved at 150° C. for 50 minutes. The following results were obtained:

| | |
|---|---|
| Hardness (König) | 212 s. |
| Impact resistance | 15 kg. cm. |
| Penetration (Erichsen) | 8.5 mm. |
| Resistance after 7 days' exposure to 5% NaOH | Excellent. |
| Resistance to acetic acid vapor | Do. |

When panels on which this lacquer had been sprayed were not stoved, but kept at room temperature, the hardness (König) of the coating was 180 seconds after 5 days.

*Example IX*

The procedure of Example I is repeated except that the polyester used in lieu of polyester solution A is a similar polyester solution prepared by substituting 1,2,6-hexanetriol for the glycerol for preparing the polyester. Related results are obtained.

*Example X*

Example I is substantially repeated wherein the polyisocyanate used is one of the following: an isomeric mixture of tolylene diisocyanate, a reaction product of ethylene glycol with excess tolylene diisocyanate, and diphenylmethane diisocyanate. Similar improved results are obtained in each instance.

We claim as our invention:

1. A polyurethane resin prepared by a process which comprises reacting an organic polyisocyanate and a hydroxyl-containing polyester prepared by reacting at a temperature between 130° and 270° C. (1) an aliphatic polyol containing from 3 to 5 hydroxyl groups and from 3 to 12 carbon atoms, (2) a polycarboxylic compound selected from the group consisting of aromatic dicarboxylic acids and dicarboxylic acid anhydrides containing from 8 to 12 carbon atoms and wherein the two carboxyl groups are attached directly to the aromatic ring and (3) glycidyl esters of mixed saturated alpha-alkyl monocarboxylic acids prepared by reacting epichlorohydrin with said monocarboxylic acids and wherein said monocarboxylic acids contain from 9 to 11 carbon atoms and are prepared by reacting monoolefins containing from 8 to 10 carbon atoms with carbon monoxide and water in the presence of liquid acid catalysts, and the isocyanato to hydroxyl ratio of the polyisocyanate and polyester reactants being between 0.8 and 1.3.

2. A polyurethane resin as in claim 1 wherein the polyisocyanate is an addition product of trimethylolpropane and tolylene diisocyanate.

3. A polyurethane resin as in claim 1 wherein the aliphatic polyol is glycerol.

4. A polyurethane resin prepared by a process which comprises reacting an organic polyisocyanate and a hydroxyl-containing polyester prepared by reacting at a temperature between 130° and 270° C. (1) glycerol, (2) phthalic anhydride and (3) glycidyl esters of mixed saturated alpha-alkyl monocarboxylic acids prepared by reacting epichlorohydrin with said monocarboxylic acids and wherein said monocarboxylic acids have the structure

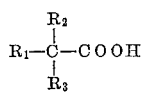

wherein $R_1$ is selected from the group consisting of hydrogen and alkyl groups, $R_2$ and $R_3$ are alkyl groups and wherein said monocarboxylic acids contain a total of 9–11 carbon atoms.

References Cited by the Examiner
UNITED STATES PATENTS

| | | | |
|---|---|---|---|
| 2,397,741 | 4/1943 | Schlack | 260—75 |
| 2,876,241 | 3/1959 | Koch et al. | 260—413 |
| 2,884,340 | 4/1959 | Loshaek | 260—75 XR |
| 2,902,462 | 9/1959 | Greenberg et al. | |
| 2,966,479 | 12/1960 | Fischer | 260—78.4 |
| 2,970,123 | 1/1961 | Rhodes et al. | 260—75 XR |
| 3,036,042 | 5/1962 | Schmidt et al. | 260—75 |
| 3,039,979 | 6/1962 | Carlick et al. | 260—76 XR |
| 3,049,506 | 8/1962 | Kibler et al. | 260—76 XR |
| 3,050,480 | 8/1962 | Budde | 260—22 |
| 3,056,818 | 10/1962 | Werber. | |

OTHER REFERENCES

Payne: "Organic Coating Technology," vol. 1, 1954, pp. 290–293.

LEON J. BERCOVITZ, *Primary Examiner*.

JOHN J. KLOCKO, *Assistant Examiner*.